(12) United States Patent
Bish et al.

(10) Patent No.: US 9,448,744 B2
(45) Date of Patent: Sep. 20, 2016

(54) MAPPING LOCATIONS OF LOGICAL VOLUME RECORDS ON A PHYSICAL STACKED VOLUME

(71) Applicant: International Business Machines Corporation, Armonk, NY (US)

(72) Inventors: Thomas W. Bish, Tucson, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 13/927,312

(22) Filed: Jun. 26, 2013

(65) Prior Publication Data
US 2013/0290625 A1 Oct. 31, 2013

Related U.S. Application Data

(62) Division of application No. 12/755,413, filed on May 6, 2010, now Pat. No. 8,533,427.

(51) Int. Cl.
*G06F 3/06* (2006.01)
*G06F 12/08* (2016.01)

(52) U.S. Cl.
CPC ........... *G06F 3/0665* (2013.01); *G06F 3/0611* (2013.01); *G06F 3/0614* (2013.01); *G06F 3/0664* (2013.01); *G06F 3/0682* (2013.01); *G06F 3/0686* (2013.01);
(Continued)

(58) Field of Classification Search
CPC .. G06F 3/0665; G06F 3/0614; G06F 3/0682; G06F 3/0664; G06F 3/0686; G06F 3/0611; G06F 2212/213; G06F 12/0866; G06F 2212/224

USPC .......................................................... 711/111
See application file for complete search history.

(56) References Cited

U.S. PATENT DOCUMENTS

| 5,546,557 A * | 8/1996 | Allen .................... G06F 3/0601 360/49 |
| 5,608,875 A | 3/1997 | Mori |
| 5,926,836 A | 7/1999 | Blumenau |

(Continued)

OTHER PUBLICATIONS

Restriction/Election Requirement from U.S. Appl. No. 12/775,413 dated Dec. 7, 2012.

(Continued)

*Primary Examiner* — Michael Alsip
(74) *Attorney, Agent, or Firm* — Zilka-Kotab, PC

(57) ABSTRACT

A system, method and computer program product for accessing host data records stored in a virtual tape storage (VTS) system. The computer program product includes a computer readable storage medium having computer readable program code embodied therewith. The computer readable program code includes computer readable program code configured to receive a mount request to access at least one host data record in a VTS system; computer readable program code configured to determine a starting logical block ID (SLBID) corresponding to the at least one requested host data record; computer readable program code configured to determine a physical block ID (PBID) that corresponds to the SLBID; computer readable program code configured to access a physical block on a magnetic tape medium corresponding to the PBID; and computer readable program code configured to output at least the physical block without outputting an entire logical volume that the physical block is stored to.

16 Claims, 9 Drawing Sheets

(52) U.S. Cl.
CPC .... *G06F 12/0866* (2013.01); *G06F 2212/213* (2013.01); *G06F 2212/224* (2013.01)

(56) References Cited

U.S. PATENT DOCUMENTS

| | | | |
|---|---|---|---|
| 6,173,359 B1 | 1/2001 | Carlson et al. | |
| 6,467,021 B1 * | 10/2002 | Sinclair | G06F 3/0601 710/68 |
| 6,490,648 B1 | 12/2002 | Kaneda et al. | |
| 6,625,704 B2 | 9/2003 | Winokur | |
| 6,708,265 B1 | 3/2004 | Black | |
| 6,816,941 B1 | 11/2004 | Carlson et al. | |
| 6,912,548 B1 | 6/2005 | Black | |
| 7,107,417 B2 | 9/2006 | Gibble et al. | |
| 7,428,604 B2 | 9/2008 | Black | |
| 7,437,492 B2 | 10/2008 | Stager et al. | |
| 7,603,530 B1 | 10/2009 | Liikanen et al. | |
| 8,533,427 B2 | 9/2013 | Bish et al. | |
| 8,656,094 B2 | 2/2014 | Peake | |
| 8,856,436 B2 | 10/2014 | Peake | |
| 8,898,428 B2 | 11/2014 | Bish et al. | |
| 9,336,149 B2 | 5/2016 | Bish et al. | |
| 2002/0035664 A1 | 3/2002 | Yates et al. | |
| 2003/0037184 A1 | 2/2003 | Day et al. | |
| 2004/0044828 A1 | 3/2004 | Gibble et al. | |
| 2004/0078639 A1 | 4/2004 | Anna et al. | |
| 2007/0055831 A1 | 3/2007 | Beeston et al. | |
| 2008/0040539 A1 | 2/2008 | Haustein et al. | |
| 2008/0172542 A1 | 7/2008 | Kaushik | |
| 2008/0244205 A1 | 10/2008 | Amano et al. | |
| 2008/0250197 A1 | 10/2008 | Daily et al. | |
| 2009/0049311 A1 | 2/2009 | Carlson et al. | |
| 2009/0083501 A1 | 3/2009 | Friauf et al. | |
| 2009/0204759 A1 | 8/2009 | Seaman et al. | |
| 2009/0237828 A1 | 9/2009 | Hatabe | |
| 2009/0248974 A1 | 10/2009 | Bello et al. | |
| 2010/0057844 A1 | 3/2010 | Johnson | |
| 2010/0103549 A1 * | 4/2010 | Murayama | G06F 3/0613 360/15 |
| 2010/0306500 A1 | 12/2010 | Mimatsu | |
| 2011/0276753 A1 | 11/2011 | Peake | |
| 2011/0276754 A1 | 11/2011 | Bish et al. | |
| 2011/0276756 A1 | 11/2011 | Bish et al. | |
| 2012/0239876 A1 | 9/2012 | Bish et al. | |
| 2012/0239877 A1 | 9/2012 | Peake | |
| 2016/0011794 A1 | 1/2016 | Bish et al. | |

OTHER PUBLICATIONS

Non-Final Office Action from U.S. Appl. No. 12/775,413 dated Jan. 2, 2013.
Notice of Allowance and Fee(s) Due from U.S. Appl. No. 12/775,413 dated Apr. 24, 2013.
Non-Final Office Action from U.S. Appl. No. 13/484,133 dated Dec. 11, 212.
Final Office Action from U.S. Appl. No. 13/484,133 dated Jun. 17, 2013.
Non-Final Office Action from U.S. Appl. No. 12/775,421 dated Jun. 8, 2012.
Final Office Action from U.S. Appl. No. 12/775,421 dated Jan. 9, 2013.
Notice of Allowance from U.S. Appl. No. 12/775,421 dated Oct. 2, 2013.
Non-Final Office Action from U.S. Appl. No. 13/484,142 dated Jun. 21, 2012.
Final Office Action from U.S. Appl. No. 13/484,142 dated Jan. 4, 2013.
Non-Final Office Action from U.S. Appl. No. 13/484,142 dated Oct. 1, 2013.
Non-Final Office Action from U.S. Appl. No. 12/775,425 dated Mar. 19, 2013.
Written Opinion and Search Report from PCT application No. PCT/EP2011/056699 dated Jul. 19, 2011.
Zhang et al., "HPTFS: A High Performance Tape File System," Proceedings of 14th NASA Goddard/23rd IEEE Conference on Mass Storage System and Technologies, 2006, pp. 1-11.
Feng et al., "TLFS: High Performance Tape Library File System for Data Backup and Archive," Proceedings of 7th International Meeting on High Performance Computing for Computational Science, Rio de Janeiro, Brazil, Springer 2006, pp. 1-14.
Bradshaw et al., "Fifty Years of IBM Innovation with Information Storage on Magnetic Tape," IBM Journal of Research and Development 47.4, 2003, pp. 373-383.
Hughes et al., "High Performance RAIT," NASA Conference Publication, NASA, 1998, 2002, pp. 65-74.
Nam et al., "A hybrid mapping technique for logical vol. manager in SAN environments," Korea Inf. Sci. Soc., Journal of KISS: Computing Practices, vol. 10, No. 1, Feb. 2004, p. 99-113.
Kang et al., "An Approach to Virtual Allocation in Storage Systems," ACM Transactions on Storage, vol. 2, No. 4, Nov. 2006, pp. 371-399.
"SAE—Stand Alone Restore," NewEra Software, Inc., Software for Image Management & System Recovery, Mar. 8, 2010, pp. 1-3.
Peake, J. W., U.S. Appl. No. 12/775,421, filed May 6, 2012.
Bish et al., U.S. Appl. No. 13/484,133, filed May 30, 2012.
Notice of Allowance from U.S. Appl. No. 12/775,425, dated Jun. 5, 2015.
Final Office Action from U.S. Appl. No. 12/775,425 dated May 30, 2014.
Notice of Allowance and Fee(s) Due from U.S. Appl. No. 13/484,142 dated Apr. 29, 2014.
Notice of Allowance from U.S. Appl. No. 13/484,133, dated Jul. 16, 2014.
Corrected Notice of Allowance from U.S. Appl. No. 13/484,133, dated Sep. 5, 2014.
Corrected Notice of Allowability from U.S. Appl. No. 13/484,142, dated Sep. 12, 2014.
Notice of Allowance from U.S. Appl. No. 12/775,425, dated Jan. 8, 2015.
Bish et al., U.S. Appl. No. 12/775,413, filed May 6, 2010.
Bish et al., U.S. Appl. No. 12/775,425, filed May 6, 2010.
Peake, J. W., U.S. Appl. No. 12/775,421, filed May 30, 2012.
Peake, J. W., U.S. Appl. No. 13/484,142, filed May 30, 2012.
Final Office Action from U.S. Appl. No. 13/484,142 dated Jan. 6, 2014.
Non-Final Office Action from U.S. Appl. No. 12/775,425 dated Oct. 18, 2013.
Bish et al., U.S. Appl. No. 14/858,736, filed Sep. 18, 2015.
Non-Final Office Action from U.S. Appl. No. 14/858,736, dated Nov. 10, 2015.
Notice of Allowance from U.S. Appl. No. 12/775,425, dated Feb. 9, 2016.
Notice of Allowance from U.S. Appl. No. 12/775,425, dated Sep. 14, 2015.
Final Office Action from U.S. Appl. No. 14/858,736, dated Mar. 28, 2016.
Notice of Allowance from U.S. Appl. No. 14/858,736, dated Jun. 6, 2016.

* cited by examiner

Virtual Tape Volume 200

| Volume Header 210 | Host Data Record 1 | 220 | Host Data Record 2 | 220 | • • • | Host Data Record J | 220 |
|---|---|---|---|---|---|---|---|

FIG. 2

Volume Header 210

| Volume ID 212 | Volume Length 214 | Volume Control Flags  216 |
|---|---|---|
| | | Partial Volume 218 |

FIG. 3

Host Data Record 220

| Block ID 222 | Record Length 224 | Compressed Host Data 226 |
|---|---|---|

FIG. 4

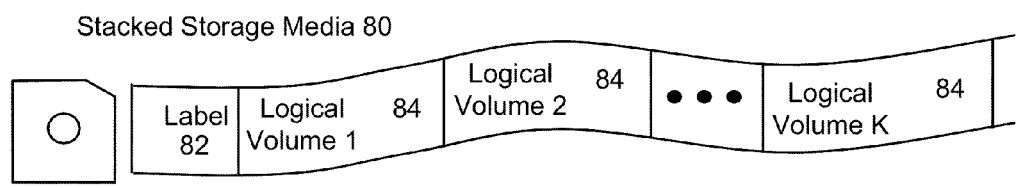
FIG. 5
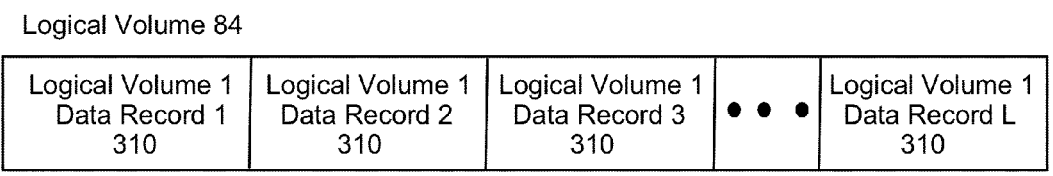
FIG. 6
Logical Volume Data Record 310
| Virtual Volume VOLSER 312 | Virtual Volume Start Block ID 314 | Virtual Volume Data 316 |
|---|---|---|
FIG. 7

Host Mount Request 400

| VOLSER 410 | New Flag 420 | Start Block ID 430 | Block Count 440 | Block Size 450 |
|---|---|---|---|---|

FIG. 8

VOLSER Database Table 68

| VOLSER 510 | Cache Resident Type 520 | Physical Tape VOLSER 530 | Starting Block 540 | Blocks 550 | Last Access Date/Time 560 |
|---|---|---|---|---|---|
| ABC123 | Resident | Null | Null | Null | 3/3/10 8:24:35 |
| EFG555 | Copied | 123456 | 39005 | 35125 | 3/1/10 17:38:12 |
| JKL777 | No | 545454 | 84278 | 39748 | 1/25/10 14:56:01 |
| XYZ999 | Partial | 999999 | 63018 | 39898 | 2/25/10 5:17:47 |

Mapping Table 600 for VOLSER XYZ999

| Physical Logical Block ID 610 | Starting Logical Block ID 620 |
|---|---|
| 1 | 1 |
| 10 | 250 |
| 20 | 572 |
| 30 | 797 |

MAPPING LOCATIONS OF LOGICAL VOLUME RECORDS ON A PHYSICAL STACKED VOLUME

RELATED APPLICATIONS

This application is a divisional of copending U.S. patent application Ser. No. 12/775,413, filed May 6, 2010; which is herein incorporated by reference.

BACKGROUND

There are a plurality of applications on large operating systems, such as mainframe and server operating systems, that place multiple datasets or objects on a tape volume. Examples include, but are not limited to, Data Facility Storage Management System (DFSMS) Hierarchical Storage Manager (HSM), DFSMS Object Access Method (OAM) and Tivoli Storage Manager (TSM). HSM and TSM may be used to migrate Direct Access Storage Device (DASD) datasets from one storage device to another, such as from a hard disk drive (HDD) to a tape drive, or to make a copy of a dataset, possibly to create a backup dataset. OAM places object data on a tape volume that may be a backup of data or original data. Typically, these applications access a database in which they keep track of the dataset/object name, the tape volume it was written to, the location on the tape volume of the dataset and/or object, and how many tape records make up the dataset/object.

When one of the migrated or backup datasets is requested by a user, these applications request a mount of the tape volume, and once the mount has completed, the applications instruct the tape drive to position to the location where the records associated with the dataset/object reside, and then read the requested records. This is typically referred to as a recall operation. If there are no other datasets on the tape volume to be recalled, the volume is demounted. The size of the dataset/object being recalled is often less than 250 KB in DFSMS HSM datasets, but may be any size in any system. There are also applications on open system platforms, such as TSM, that work in this way.

In physical tape drives, one of the key functions that is typical of an enterprise class tape drive is the ability to do a high speed locate operation to the beginning of the data to be read. This allows the tape drive to position to the requested data much faster than by just using conventional forward space block and read commands.

For a virtual tape storage (VTS) system that internally employs hierarchical storage, there are several reasons that a significant amount of inefficiency occurs when handling the above described types of application workloads. One of the biggest problems encountered when putting applications with this type of data on a VTS system is the time that occurs while waiting for a recall operation to retrieve the requested data. Currently, if the recall times are not acceptable to the user of the VTS system, native tape drives are added to the overall solution to replace non-native ones, and this can significantly increase the cost of the system to the customer.

Therefore, it would be beneficial to have a system and/or method which could reduce the inefficiencies in accessing data on VTS systems which employ hierarchical storage.

SUMMARY

A computer program product for accessing host data records stored in a virtual tape storage (VTS) system is provided according to one embodiment. The computer program product includes a computer readable storage medium having computer readable program code embodied therewith. The computer readable program code includes computer readable program code configured to receive a mount request to access at least one host data record in a VTS system; computer readable program code configured to determine a starting logical block ID (SLBID) corresponding to the at least one requested host data record; computer readable program code configured to determine a physical block ID (PBID) that corresponds to the SLBID; computer readable program code configured to access a physical block on a magnetic tape medium corresponding to the PBID; and computer readable program code configured to output at least the physical block without outputting an entire logical volume that the physical block is stored to.

A method for accessing host data records stored in a virtual tape storage (VTS) system, according to one embodiment, includes sending a mount request to access at least one host data record in a VTS system, the mount request including a starting logical block ID (SLBID) of a first host data record; and accessing a tape volume cache of the VTS system once the at least one requested host data record is available.

A virtual tape storage (VTS) system according to one embodiment includes at least two levels of hierarchical storage, including a first level being random access storage comprising at least one hard disk media; and a second level being sequential access storage comprising at least one magnetic tape media. The system also includes logic configured to construct a mapping table that relates starting logical block IDs (SLBIDs) of host data records to physical block IDs (PBIDs) of physical blocks stored to the magnetic tape media; logic configured to receive a mount request to access at least one host data record; logic configured to determine a SLBID corresponding to the at least one requested host data record, wherein the SLBID is determined from information provided in the mount request; logic configured to determine a PBID that corresponds to the SLBID using the mapping table; and logic configured to copy at least the physical block corresponding to the PBID from the magnetic tape media to the hard disk media without copying an entire logical volume that the physical block is stored to.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 2 is a generalized diagram of a virtual volume used to store data in the virtual tape storage system of FIG. 1C, in one embodiment.

FIG. 3 is a generalized diagram of a volume header that is part of a virtual volume of FIG. 2, in one embodiment.

FIG. 4 is a generalized diagram of a host data record that is part of a virtual volume of FIG. 2, according to one embodiment.

FIG. 5 is a generalized diagram of stacked logical volumes stored on a single physical storage media volume for use in the virtual tape storage system of FIG. 1C, according to one embodiment.

FIG. 6 is a generalized diagram of a logical volume stored on a single physical storage media volume for use in the virtual tape storage system of FIG. 1C, according to one embodiment.

FIG. 7 is a generalized diagram of the logical volume data record that is part of the logical volume of FIG. 6, according to one embodiment.

FIG. 8 is a generalized diagram of a host mount request used with a virtual tape storage system of FIG. 1C, according to one embodiment.

FIG. 9 is a generalized diagram that shows the contents of the virtual volume database of the virtual tape storage system of FIG. 1C, according to one embodiment.

FIG. 10 is a continuation of the generalized diagram that shows the contents of a mapping table of the virtual volume database of the virtual tape storage system of FIG. 1C, according to one embodiment.

DETAILED DESCRIPTION

Figure 1A:
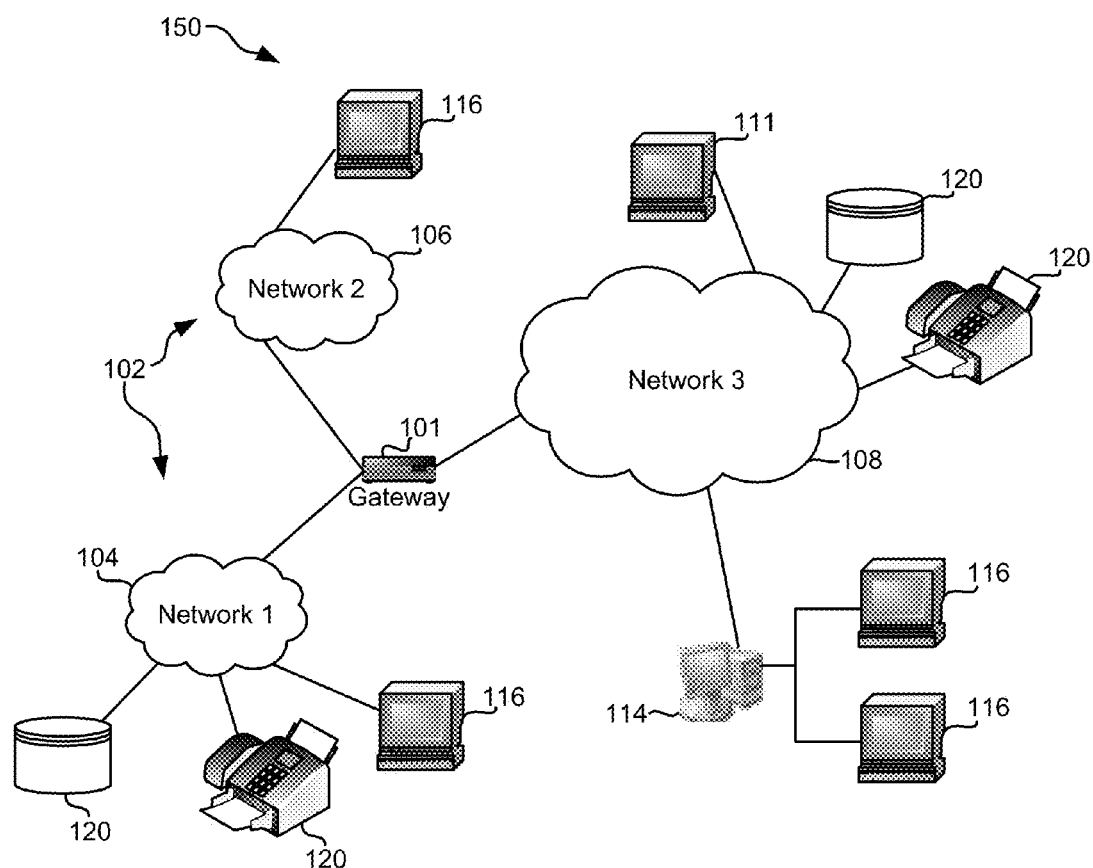
FIG. 1A illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to a preferred embodiment of the present invention, sometimes referred to as partial volume recall, an application's positional information relating to requested data may be used by a virtual tape storage (VTS) system to correlate to a position of the actual physical location (at or before the beginning) of the requested data on a physical stacked tape. Also, in some approaches, a mapping table, which may be stored and updated in the VTS system, may be used to approximate the physical block location of the requested data based on the logical block ID provided by the application.

In one general embodiment, a method for accessing host data records stored in a virtual tape storage (VTS) system comprises receiving a mount request to access at least one host data record in a VTS system, determining a starting logical block ID (SLBID) corresponding to the at least one requested host data record, determining a physical block ID (PBID) that corresponds to the SLBID, accessing a physical block on a sequential access storage medium corresponding to the PBID, and outputting at least the physical block corresponding to the PBID without outputting an entire logical volume that the physical block is stored to.

According to another general embodiment, a virtual tape storage (VTS) system comprises random access storage, sequential access storage, support for at least one virtual volume, a storage manager having logic for determining a physical block ID (PBID) that corresponds to a starting logical block ID (SLBID), and logic for copying a portion of a logical volume from the sequential access storage to the random access storage without copying the entire logical volume.

In yet another general embodiment, a computer program product includes a computer readable storage medium having computer readable program code embodied therewith. The computer readable program code comprises computer readable program code configured to send a mount request to access at least one host data record in a VTS system, the mount request including a starting logical block ID (SLBID) of a first host data record, and computer readable program code configured to access a tape volume cache of the VTS system once the at least one requested host data record is available.

In yet another general embodiment, a computer program product includes a computer readable storage medium having computer readable program code embodied therewith. The computer readable program code comprises computer readable program code configured to receive a mount request to access at least one host data record in a VTS system, computer readable program code configured to determine a starting logical block ID (SLBID) corresponding to the at least one requested host data record, computer readable program code configured to determine a physical block ID (PBID) that corresponds to the SLBID, computer readable program code configured to access a physical block on a magnetic tape medium corresponding to the PBID, and computer readable program code configured to output at least the physical block without outputting an entire logical volume that the physical block is stored to.

According to another general embodiment, a virtual tape storage (VTS) system comprises at least two levels of hierarchical storage, including a first level being random access storage comprising at least one hard disk media, and a second level being sequential access storage comprising at least one magnetic tape media. The VTS system also includes logic for constructing a mapping table that relates starting logical block IDs (SLBIDs) of host data records to physical block IDs (PBIDs) of physical blocks stored to the magnetic tape media, logic for receiving a mount request to access at least one host data record, logic for determining a SLBID corresponding to the at least one requested host data record, wherein the SLBID is determined from information provided in the mount request, logic for determining a PBID that corresponds to the SLBID using the mapping table, and logic for copying at least the physical block corresponding to the PBID from the magnetic tape media to the hard disk media without copying an entire logical volume that the physical block is stored to.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A illustrates a network architecture 150, in accordance with one embodiment. As shown in FIG. 1A, a plurality of remote networks 102 are provided including a first remote network 104 and a second remote network 106. A gateway 101 may be coupled between the remote networks 102 and a proximate network 108. In the context of the present network architecture 150, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 1B:
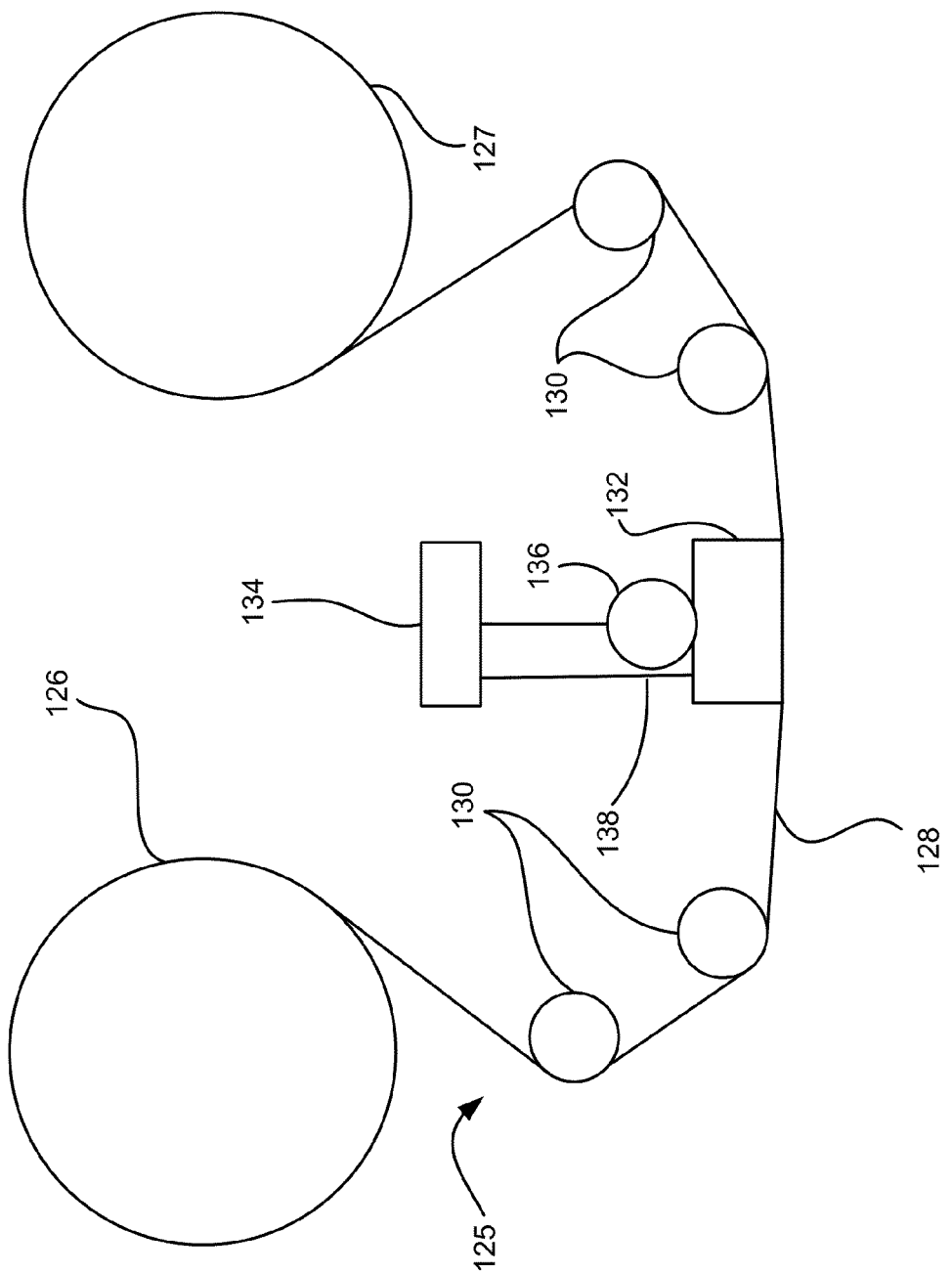
FIG. 1B is a schematic of tape drive system, in accordance with one embodiment.

FIG. 1B is a schematic diagram of a simplified tape drive system 125, in accordance with one embodiment, which may be a standalone unit, part of a tape library system, a peripheral 120 of FIG. 1A, etc. Such a tape drive may be employed in the context of an embodiment of the present invention. While one specific implementation of a tape drive 125 is shown in FIG. 1B, it should be noted that the embodiments of the previous figures may be implemented in the context of any type of tape drive system.

As shown, a tape supply cartridge 126 and a take-up reel 127 are provided to support a tape 128. These may form part of a removable cassette and are not necessarily part of the system. Guides 130 guide the tape 128 across a preferably bidirectional tape head 132. Such tape head 132 may be a MR, GMR, TMR, spin-valve, or other type. Tape head 132 is in turn coupled to a controller assembly 134 via a connector cable 138. The controller 134, in turn, controls head functions such as servo following, write bursts, read functions, etc. An actuator 136 controls position of the head 132 relative to the tape 128.

A tape drive, such as that illustrated in FIG. 1B, includes drive motor(s) to drive the tape supply cartridge 126 and the take-up reel 127 to move the tape 128 linearly over the head 132. The tape drive also includes a read/write channel to transmit data to the head 132 to be recorded on the tape 128 and to receive data read by the head 132 from the tape 128. An interface is also provided for communication between the tape drive and a host (integral or external) to send and receive the data and for controlling the operation of the tape drive and communicating the status of the tape drive to the host, all as will be understood by those of skill in the art.

Figure 1C:
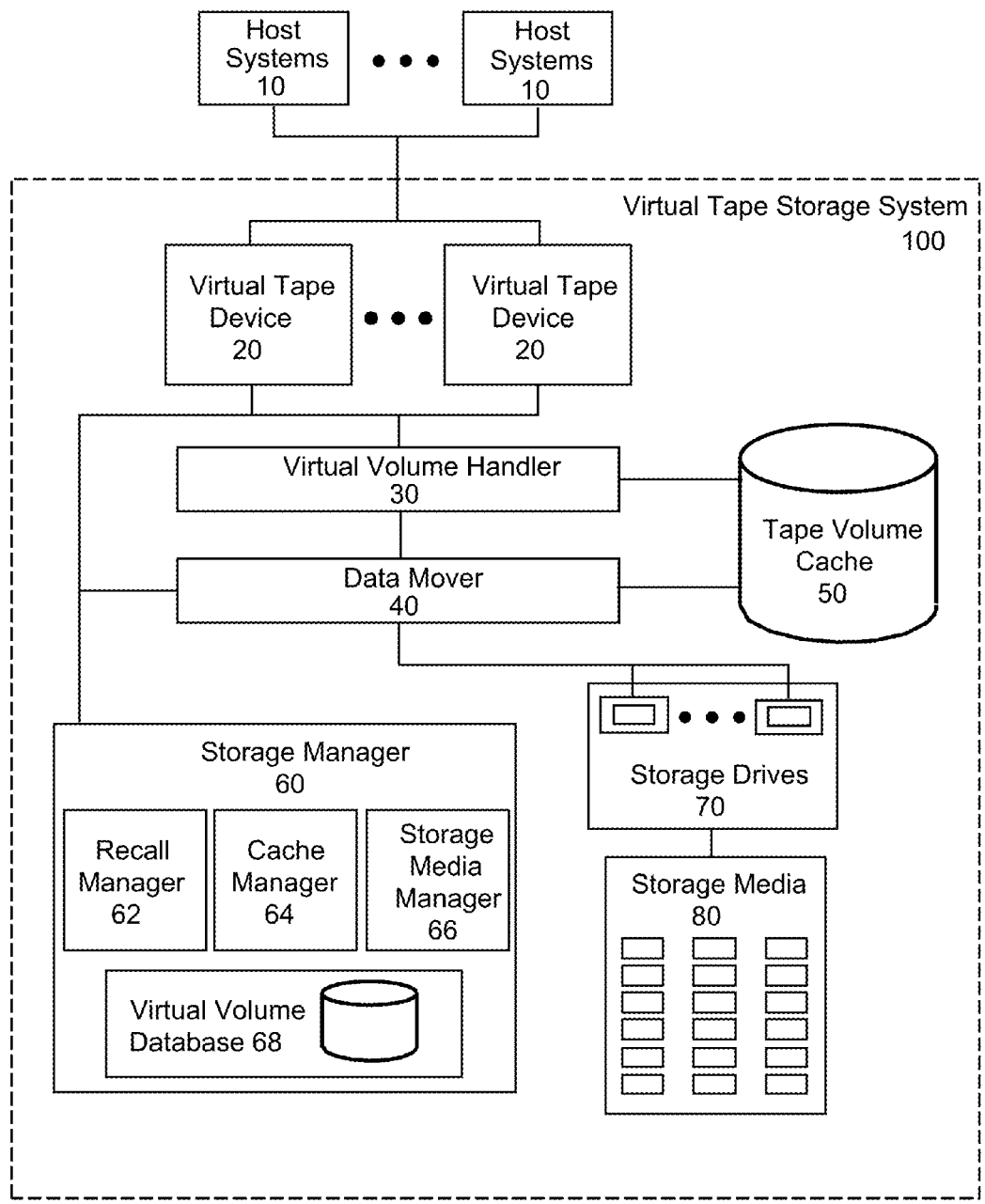
FIG. 1C is a block diagram showing an interconnection of functional components of a virtual tape storage system for partially recalling host-originated virtual volumes from physical tape storage to cache storage, in accordance with one embodiment.

Referring now to FIG. 1C, a block diagram of a virtual tape storage (VTS) system 100, for example an IBM TS7700 Virtual Tape Storage System, is shown coupled to a plurality of host systems 10. Application programs running within any host system 10 generate data to be stored within the VTS system 100. The host system 10 may be embodied by a variety of types and numbers of processing units, such as a mainframe computer, a personal computer, a server, a workstation, etc. The application programs may be of any number of types, including, but not limited to, hierarchical storage, data backup/recovery, master data file processing, etc.

Applications particularly well suited to utilize some embodiments of the methods and systems described herein are hierarchical storage applications, such as IBM Data Facility Storage Management System (DFSMS) Hierarchical Storage Manager (HSM), IBM Tivoli Storage Manager, etc. How these applications utilize tape storage is known in the art. The VTS system 100 includes a plurality of virtual tape devices 20 interconnected to the host system 10 and a virtual volume handler 30. The virtual volume handler 30 is coupled to the tape volume cache 50. A data mover 40 is also coupled to the tape volume cache 50 and a plurality of storage drives 70. Also, included in the VTS system 100 is a plurality of storage media 80. The storage media 80 may comprise a variety of types of sequential storage media, such as magnetic tape, optical disk, etc. The storage drives 70 may also include magnetic tape drives, optical drives, etc. Storage media 80 is moved to/from storage drives 70 by mechanical means (such as an automated tape system, not shown). The storage manager 60 is also coupled to the host system 10 through the virtual tape devices 20 as well as to all other elements of the VTS system 100. The storage manager 60 is comprised of at least one recall manager 62, at least one cache manager 64, at least one storage media manager 66 and at least one virtual volume database 68. The storage manager 60 may comprise a digital processing apparatus such as a microprocessor, personal computer, a more advanced processing machine, etc. The number of virtual volumes (e.g., volume 200 of FIG. 2) included in a VTS system 100 may number in the hundreds to the tens of thousands to many millions. Information about each of the virtual volumes 200 included in the VTS system 100 is kept in the virtual volume database 68 by the storage manager 60. The storage for the virtual volume database 68 is typically disk, but other non-volatile storage technologies, such as flash, RAM, etc., may be employed.

FIG. 2 is a representation of a virtual volume 200 used in a virtual tape storage (VTS) system (e.g., VTS system 100 of FIG. 1C) to store host system application data, according to one embodiment. A virtual volume 200 includes a volume header 210 and "J" host data records 220, in some approaches. Within a VTS system, there are a plurality of virtual volumes 200, each identified by a unique volume identifier, typically called a volume serial number (VOLSER). A plurality of virtual volumes 200 may be stored in the tape volume cache and managed by the storage manager, in some approaches.

FIG. 3 is a representation of a volume header 210, in one embodiment, that may be part of a virtual volume (e.g., volume 200 of FIG. 2). The volume header 210 may be made up of several elements and may be used by the storage manager and/or the virtual volume handler in managing a virtual volume, according to preferred embodiments. The elements may comprise a volume ID 212 which includes the unique volume identifier (VOLSER) for the virtual volume, a volume length 214 which includes a value that represents the overall number of bytes stored in the virtual volume, and a set of volume control flags 216. The volume control flags 216 may include many pieces of information useful in the management of a virtual volume, however, in accordance with some embodiments, only a single control flag, partial volume 218 is described.

With reference to FIGS. 1C, 2, and 4, FIG. 4 is a representation of a host data record 220 that may be part of a virtual volume 200, in one embodiment. A host data record 220 may be made up of several elements and may be used by the storage manager 60 and the virtual volume handler 30 in managing a virtual volume 200. A host data record 220 may have a variable length, dependent on the host written data record length and the amount of compression the virtual tape device 20 yields for the record. The elements may comprise a block ID 222 which includes a value that is incremented for every host written data block, a record length 224 which includes a value that represents the overall number of bytes of the last element, which may be compressed host data 224 which includes the post compressed data written by a host system 10.

FIG. 5 is a representation of a stacked storage media 80 physical tape volume that includes a label 82 and a plurality of logical volumes 84, according to one embodiment. The label 82 is typically a standard set of tape records that identifies the volume serial number (VOLSER) of the physical volume, its recording format, and other information, such as ownership. The label 82, in some embodiments, may be of a type well known in the art, such as an IBM Standard Tape Label or an ANSI Standard Volume Label. Referring to FIGS. 1C, 2, and 5, a logical volume 84 may be a copy of or derived from a virtual volume 200 from the tape volume cache 50 written by an independent drive and added to the VTS system 100, written directly from a host system 10 to a drive of the VTS system 100, etc. Logical volumes 84 may be placed end to end on the storage media 80 and are commonly referred to as being "stacked" on the media.

With reference to FIGS. 5 and 6, in FIG. 5 a representation of a logical volume 84 that has been copied to storage media 80 is shown according to one approach. A logical volume 84 includes a plurality of logical volume data records 310, each corresponding to a physical block on the storage media 80, the number depending on the amount of data stored on the virtual volume 200 the logical volume 84 is a copy of, in one embodiment. In this described embodiment, the length of the logical volume data record 310 may be fixed at 256 KB (261,784 bytes). Alternative embodiments are possible using different fixed logical volume data record 310 sizes, such as 128 KB, 512 KB, 1 MB, etc. Data from a virtual volume 200 may be segmented to fit into that record size as described later. The physical block that contains each logical volume data record 310 may be assigned a physical block ID (PBID) as it is written to the storage media 80, or at some other time as is convenient in the processing of the storage media (for example, several block IDs may be written in a single operation). The storage drive 70 may use the block ID in a subsequent search operation to quickly position the storage media 80 at a requested block ID. This search capability is well known as employed in many tape storage drives, such as the IBM 3592 High Performance Tape System, etc.

With reference to FIGS. 1C, 2, 5, and 7, in FIG. 7, a representation of a logical volume data record 310 is shown according to one embodiment. It includes two information fields and a data field. The first information field, virtual volume VOLSER 312, includes the volume serial number of the virtual volume 200. During a recall of a logical volume 84, the virtual volume VOLSER 312 field is used by the recall manager 62 to ensure that the correct virtual volume 200 is being copied back into the tape volume cache 50, in one approach. The second information field, virtual volume start block ID 314, includes the block ID 222 of the host data record 220 that starts at the beginning of the virtual volume data 316 field, in one embodiment. In accordance with one embodiment, the virtual volume start block ID 314 field may be used by the recall manager 62 to ensure that the correct host requested data records will be part of the data recalled into the tape volume cache 50. In this embodiment, the virtual volume VOLSER 312 field may be 6 bytes in length and the virtual volume start block ID 314 field may be 12 bytes in length. This leaves a total of 261,766 bytes for the virtual volume data field 316. Therefore, every logical volume data record 310 includes 261,766 bytes of the virtual volume 200 being copied to the storage media 84. For any virtual volume 200 with a length greater than 261,766 bytes, multiple logical volume data records 310 are used to store the virtual volume 200 on storage media 84, in a preferred embodiment.

With reference to FIGS. 1C, 2, and 8, in FIG. 8, a representation of a host mount request 400 that may be sent from the host system 10 to one of the virtual tape devices 20 in order to access a virtual volume 200 in a VTS system 100 is shown according to one embodiment. Included in the host mount request 400 is the VOLSER 410 field that may be used to pass the volume serial number (VOLSER) of the virtual volume 200 that the host system 10 desires access to, or, in the alternative, if this field includes all blanks, the storage manager 60 may select any available free virtual volume 200 to satisfy the request, in one approach. Also included is a new flag field 420 that indicates that the host system 10 will write the virtual volume 200 from its beginning and any old data associated with the selected volume serial number (VOLSER) can be discarded. The start block ID 430, block count 440 and block size 450 fields of the host mount request 400 may be used by the host system 10 when it requests that an existing virtual volume 200 is to be made accessible and is indicating that only the portion of the volume specified by the three fields is to be recalled into the tape volume cache 50, in one embodiment. Although only one group of these three fields is shown, it should be clear to those skilled in the art of building storage systems that multiple groups may be specified as part of the host mount request 400.

With reference to FIGS. 1C, 2, and 9, in FIG. 9, a representation of a few entries in the virtual volume database 68 for the virtual volumes 200 included in the VTS system 100 and managed by the storage manager 60 are shown according to one embodiment. Entries 501, 502, 503 and 504 are for virtual volumes 200 ABC123, EFG555, JKL777 and XYZ999, respectively. For each entry, the virtual volume database 68 includes a VOLSER 510 field that identifies the volume serial number of the virtual volume 200 associated with the entry, in one approach. Each entry also includes a cache residency 520 field that holds the status of the virtual volume 200 in regard to the tape volume cache 50, in another embodiment.

According to one approach, and not limiting in any way, the cache residency 520 field may include "Resident" if the virtual volume 200 is only included in the tape volume cache 50, it may include "Copied" if the virtual volume 200 is included in the tape volume cache 50 and is on a storage media 80, it may include "No" if the virtual volume 200 is only included on storage media 80, and it may include "Partial" if only a portion of virtual volume 200 is included in the tape volume cache 50.

Now referring to physical tape VOLSER 530, this field may include the volume serial number of the storage media 80 that a virtual volume 200 has been copied to. If the virtual volume 200 has not yet been copied to storage media 80, then this field may include "Null." Starting block 540 may include the physical block ID (PBID) on storage media 80 that the first segment of virtual volume 200 has been copied to. Blocks 550 may include the total number of blocks (and thus logical volume data records 310) on the storage media 80 used to copy the entire virtual volume 200. The last access/date time 560 field may include a date and time stamp of when the virtual volume 200 was last accessed by a host system 10.

With reference to FIGS. 1C, 2, 9, and 10, in FIG. 10, a representation of a few entries in a virtual volume database 68 for a mapping table 600 for virtual volume 200 XYZ999 (entry 504 in FIG. 9) included in the VTS system 100 and managed by the storage manager 60 is shown, in accordance with one embodiment. Mapping table 600 includes pairs of entries, one entry being a physical block ID (PBID) 610 and the other entry being a starting logical block ID (SLBID) 620. SLBID 620 contains the block ID of the host data record 220 that begins in the physical block identified by PBID 610. The number and use of entry pairs is further described later.

Now, referring back to FIGS. 1C-3 and 8, the virtual tape devices 20 within the VTS system 100 appear to the host system 10 as multiple storage devices, such as 256 IBM 3490 tape storage devices, each with a unique address, in one approach. The hierarchical storage application running on a host system 10 creates a new virtual volume 200 by first having the host system 10 send a host mount request 400 to request that a virtual volume 200 be mounted on one of the virtual tape devices 20. The host mount request 400 indicates that the mount request is for a new volume by setting the new flag 420 to "Yes" and may include either a specific volume serial number in the VOLSER 410 field or all blanks in the VOLSER 410 field to indicate that the next available free virtual volume 200 is to be selected. Since this is a mount request for a new volume, the fields: start block ID 430, block count 440 and block size 450 may not be used and may include blanks or zeroes. The mount request is passed through the virtual tape device 20 to the storage manager 60, in one approach. The storage manager 60 then instructs the virtual volume handler 30 to create the virtual volume 200 in the tape volume cache 50. The virtual volume handler 30 writes a volume header 210 which includes the volume ID 212, a volume length 214 of zero, since this is a new volume, and in accordance with the present embodiment, the partial volume flag 218 may be set to "OFF." The storage manager 60 may also create/update its virtual volume database 68 with information about the virtual volume 200 being mounted, updating it cache resident type 520 to "Resident" indicating that it is only in the tape volume cache 50. Once the virtual volume 200 has been created in the tape volume cache 50, the virtual tape device 20 the mount request was received on indicates to the host system 10 that the mount is complete and that the application can begin to write data to that virtual tape device 20, in one embodiment.

In some embodiments, the hierarchical storage application running on a host system 10 now may migrate one or more host data files to the VTS system 100 by writing data to the virtual tape device 20. As each host data block is written, the data block, typically 16 KB (but not limited to 16 KB, for example, 8 KB, 32 KB, 64 KB, etc.), is compressed by the virtual tape device 20 and passed to the virtual volume handler 30. The virtual volume handler 30 may build a host data record 220 (FIG. 4) which includes the incrementing block ID 222, record length 224, and the compressed host record 226, in one approach. The host data record 220 may then be appended to the virtual volume 200 associated with the virtual tape device 20 the application is using. The hierarchical storage application will continue to write data blocks until either the virtual volume 200 has reached its capacity or there are no more host data files to migrate. In either case, the host system 10 will instruct the VTS system 100 to demount the virtual volume 200 through the virtual tape device 20.

According to some approaches, the demount request may be passed through the virtual tape device 20 to the storage manager 60. The storage manager 60 may instruct the virtual volume handler 30 to close the virtual volume 200 in the tape volume cache 50. It may also update the last access/data time field 560 in the virtual volume database 68. As part of closing the virtual volume 200 in the tape volume cache 50, the virtual volume handler 30 may update the volume header 210 to include some information, such as the overall length of the volume in volume length 214, in one embodiment.

Mapping a Location of Logical Volume Records on a Physical Stacked Volume

In physical tape drives, one of the key functions is the ability to do a high speed locate operation to the beginning of the data to be read. This allows the tape drive to position to the requested data much faster than by just using conventional forward space block and read commands. This functionality also aids in performing recall operations.

Previous VTS systems that employ hierarchical storage are inefficient in handling recall operations since they recall an entire logical volume from the physical tape into cache before allowing the application that requested the recall to access the logical volume's data and the serialization of the operation. This is due, at least in part, to the VTS system not knowing which portion of a logical volume is requested by the application. The use of larger logical volumes, e.g., 4 GB and greater, further increases this inefficiency, as the time required to move the data from the tape to cache increases substantially with larger logical volume sizes.

This leads to an inefficiency in that the amount of data that is copied from physical tape back into cache is generally far greater than the amount of data actually requested to be read by the host application. One other aspect of previous VTS systems that is problematic is that the tape volumes that the applications are aware of are a logical construct and there is not a one-to-one relationship between the tape volumes and a physical tape to which they are copied. Many logical volumes are 'stacked' end-to-end on a physical tape volume to maximize the utilization of the physical media. This means that the positioning information that an application maintains for the location of a given dataset has no direct relationship to the location of the data on the underlying physical tape media. Also, the host written tape records are optionally compressed causing further variation in actual data locations on the physical tape. During a recall operation, if the tape drive over shoots the desired volume when fast forwarding to an approximated volume location on the tape, the drive must "backhitch" by stopping the tape, rewinding the tape, and then reversing again to read the tape at a point that the drive assumes is prior to the start of the desired volume. Of course, if this position on the tape is not prior to the desired volume, the process must be repeated. Meanwhile, the user that requested the data must wait for these actions to transpire before any data can be viewed, accessed, etc.

The foregoing problems may be solved with an advance in the art, which is described herein in various embodiments, including a system for partial recall of a virtual volume. The system, in one embodiment, includes a VTS system (such as VTS system 100 in FIG. 1C) supporting at least one virtual volume that is accessed through at least one virtual tape device. The VTS system also supports at least two levels of hierarchical storage, at least one level being random access storage, such as a disk-based storage system, and one level being sequential access storage, such as a physical tape drive and media. The storage capacity of each may be such that the physical tape storage is many times the capacity of the random access storage. The VTS system preferably employs data compression to reduce the amount of space required to store the data contained in a virtual and/or physical tape volume, in preferred embodiments. Data records of a fixed size written by the host system may be compressed resulting in smaller host data records stored on a virtual volume. The size of each resulting smaller host data record is dependent on the compressibility of the data of each host data record. The VTS system also places a plurality of virtual volumes on physical tape media and may copy virtual volume data between random access storage and physical tape. Pluralities of compressed host data records for a virtual volume may be combined to create larger fixed size data blocks written to physical tape media. The random access storage serves as a cache for virtual volumes and is referred to as a "tape volume cache." All host system access to the data contained in a virtual volume is through the tape volume cache, in preferred approaches. Additionally, the processor may maintain data attributes bound to the logical volume to be used in the location and management of the virtual volume's data.

In one embodiment, the VTS system comprises a processor configured to allow a host system to access a subset of the data associated with a logical volume, with the proviso that all of the logical volume's data is not copied into the tape volume cache from its location on physical media, in one embodiment. The host system may provide information to the processor, such that the processor may retrieve only the portion of the logical volume requested from physical media and configures the retrieved data in its tape volume cache such that the essential structure of a virtual volume remains so that, to the host system and its application programs, it appears that the system is accessing the whole virtual volume, and not just a subset of the data in a partial virtual volume.

In another embodiment, the information the host system provides the processor regarding the portion of a virtual volume for which access is desired is the starting logical block identifier (SLBID) relative to the beginning of the virtual volume, the number of host data records to be accessed, and the size of the uncompressed host data records, in some embodiments. The processor uses the SLBID and information the processor retained regarding the mapping of host data record numbers to the physical block ID (PBID) of the fixed size physical blocks written to physical media to then determine the PBID of the physical block written to physical media that contains the starting host data record. In one approach, the processor builds a map for a virtual volume comprising an entry for every Nth (e.g., single, tenth, twentieth, hundredth, etc.) physical block written to physical media that contains the record number of the first host data record in that physical block. The processor also uses the number of host data records information to determine at least the minimum number of physical blocks to retrieve from the physical media to ensure all of the host system requested data is available in the tape volume cache, in one approach.

In some embodiments, a mount command issued to the VTS system may be modified to provide additional information about the requested data. In addition to the logical volume the data resides on, the application may provide the logical block location of the beginning of the dataset/object that is requested, the number of data records that make up that dataset/object, and/or the uncompressed size of the data records. Since the data written to physical tape is in a packed structure, in some approaches, meaning that multiple host records are aggregated into a single 256 KB record that is written to the physical media, a method with which the physical block identification number (PBID) of the physical tape record can be found that contains the beginning of the requested dataset/object from the application would speed the data recall. To satisfy this need, in one embodiment, the application requesting the data may provide a logical block ID for the logical volume, and the VTS system may use information from a mapping table stored in the VTS system's database or other structure to determine the physical block ID (PBID) on the physical media that contains the logical volume the requested data resides on.

Now referring to FIGS. 1C, 4, 7 and 10, in FIG. 10, the mapping table 600 for VOLSER XYZ999, in one approach, may contain entries that retain the logical block ID of the first host data record included in a physical block written to the physical volume. This mapping table 600 for VOLSER XYZ999 may have an entry for every physical block in one approach, or have fewer entries depending on how much storage space is available for the table, in other approaches. It is not necessary to keep the table in system memory, as the time required to access the mapping table from disk is miniscule compared to the time that is saved by positioning the physical tape media to the correct block location before performing standard reading operations. The mapping table 600 subset entries 601, 602, 603, and 604, along with others not shown, may be created as the logical volume is being copied to the storage media 80 by the data mover 40, in one approach, or at some other time. Since the data mover 40 is packing the host data records 220 into the logical volume data records 310, it has all of the information about the starting logical block IDs (SLBIDs) and the physical block ID (PBID) of the resulting physical block written to the storage media 80, such as magnetic tape. If not all physical blocks are included in the mapping table, then in order to ensure the requested data is copied into the tape volume cache 50 once the volume is positioned, more than one data record may be read from the storage media 80. See the following examples to illustrate how many data records are read based on a limited mapping table (which does not include all PBIDs).

In one embodiment, the mapping table 600 for VOLSER XYZ999 may include all physical block entries, a portion of which is shown in exemplary Table 1.

TABLE 1

| PBID | SLBID |
|------|-------|
| 1    | 1     |
| 2    | 14    |
| 3    | 22    |
| 4    | 31    |
| 5    | 46    |
| 6    | 53    |
| ...  | ...   |
| 1050 | 8465  |
| 1051 | 8481  |
| 1052 | 8492  |
| 1053 | 8505  |
| 1054 | 8522  |
| ...  | ...   |

In another embodiment, the mapping table 600 for VOLSER XYZ999 may be more sparsely populated, possibly because of limited space available for storage of the mapping table 600, a portion of which is shown in exemplary Table 2.

TABLE 2

| PBID | SLBID |
|------|-------|
| 1    | 1     |
| 11   | 99    |
| 21   | 231   |
| 31   | 310   |
| 41   | 378   |
| 51   | 561   |
| ...  | ...   |
| 1051 | 8481  |
| 1061 | 8562  |
| ...  | ...   |

According to one illustrative embodiment, presented by way of example only with illustrative values that may be different in a variety of implementations and with reference to FIGS. 2, 6, and 7, each logical volume data record 310 may be comprised of a virtual volume VOLSER 312 field, a virtual volume start block ID 314, and virtual volume data 316 which is comprised of host data records 220. The logical volume data record 310 is written as a physical block and may be 256 KB in length (261,784 bytes), except for the last record, since in one embodiment, a logical volume's data does not span a physical block. In some embodiments, a host data record (typically a very large data record) may span across two or more physical blocks. Of course, the lengths (number of bytes) of each of these fields may be different than that described above, and each physical block and/or host record may have more or less fields than are described above.

To arrive at the lengths previously described for the fields included in the illustrative physical tape record format, some assumptions were used, including that the host uncompressed record size is 32760 bytes, that the starting PBID for a logical volume XYZ999 is 1000, that the SLBID (start block ID 430) for the requested dataset is 8500, and the number of host data records 220 requested is 10. Of course, if any of these assumptions are not accurate, as some of these values may change from one system to another, and from one format to another, the field lengths previously described may change, possibly in a proportional manner to the changes in the values assumed above.

If there is a mapping table 600 entry for every physical block, then in order to locate a logical block ID, a table entry that includes the start block ID 430 is located. Referring again to Table 1, above, and using the assumptions described above, using a full table directly yields that the tape drive should be positioned to PBID 1052 to read a start block ID 430 for the requested dataset of 8500. To ensure that all of the 10 requested host data records is copied into cache, at least three physical blocks are read, including records 1052, 1053, and 1054, in one approach.

If the mapping table does not have an entry for every physical tape record, as shown in exemplary Table 2, above, then the tape may be positioned at the highest PBID whose logical block ID entry is lower than the requested SLBID, in one approach. To ensure that enough data is read to account for the requested data, the physical blocks from that first position to the next position, minus 1, in the table may be read. For the sparsely populated exemplary Table 2, the tape drive may be positioned to a physical block corresponding to PBID 1051 and physical blocks through 1060 may be read to ensure that the requested records for the dataset are read into the tape volume cache 50.

Once the drive is positioned to the data, reading in the additional records for the alternative sparsely populated mapping Table 2 takes a small amount of time. For example, assuming that Table 2 is used and the physical block size is 256 KB, less than 2.5 MB of data would be read into the tape volume cache 50. With drives capable of transferring data in excess of 100 MB/sec, reading that amount of data takes far less than a second, so even a more sparsely populated mapping table could be used, for example, a mapping table having entries for every 20th PBID, every 25th PBID, every 100th PBID, etc. The trade-off to having a more sparsely populated mapping table is the amount of storage occupied by the mapping table versus the time needed to ensure the requested data has been moved into cache.

For example, if there is an entry for every 100 physical blocks, each entry would consume 8 bytes, 4 bytes for the physical block number and 4 bytes for the logical block ID. For a 4 GB logical volume, 157 entries would be used or 1.2 KB per logical volume, or 120 MB for 100,000 logical volumes. Whenever a dataset is requested, a minimum of 100 tape data records or approximately 26 MB of data is read in. That still is performed in a fraction of a second, assuming the data transfer rates described above.

Therefore, with the methods described above, the compressibility of the data is not required to be known in order to accurately position and efficiently obtain the requested data. However, without the compressibility of the data, a mapping table may be created and occupies some amount of disk space, depending on the number of entries per mapping table. This, as described above, is of little consequence when compared with the time saved in searching for datasets.

Figure 11:
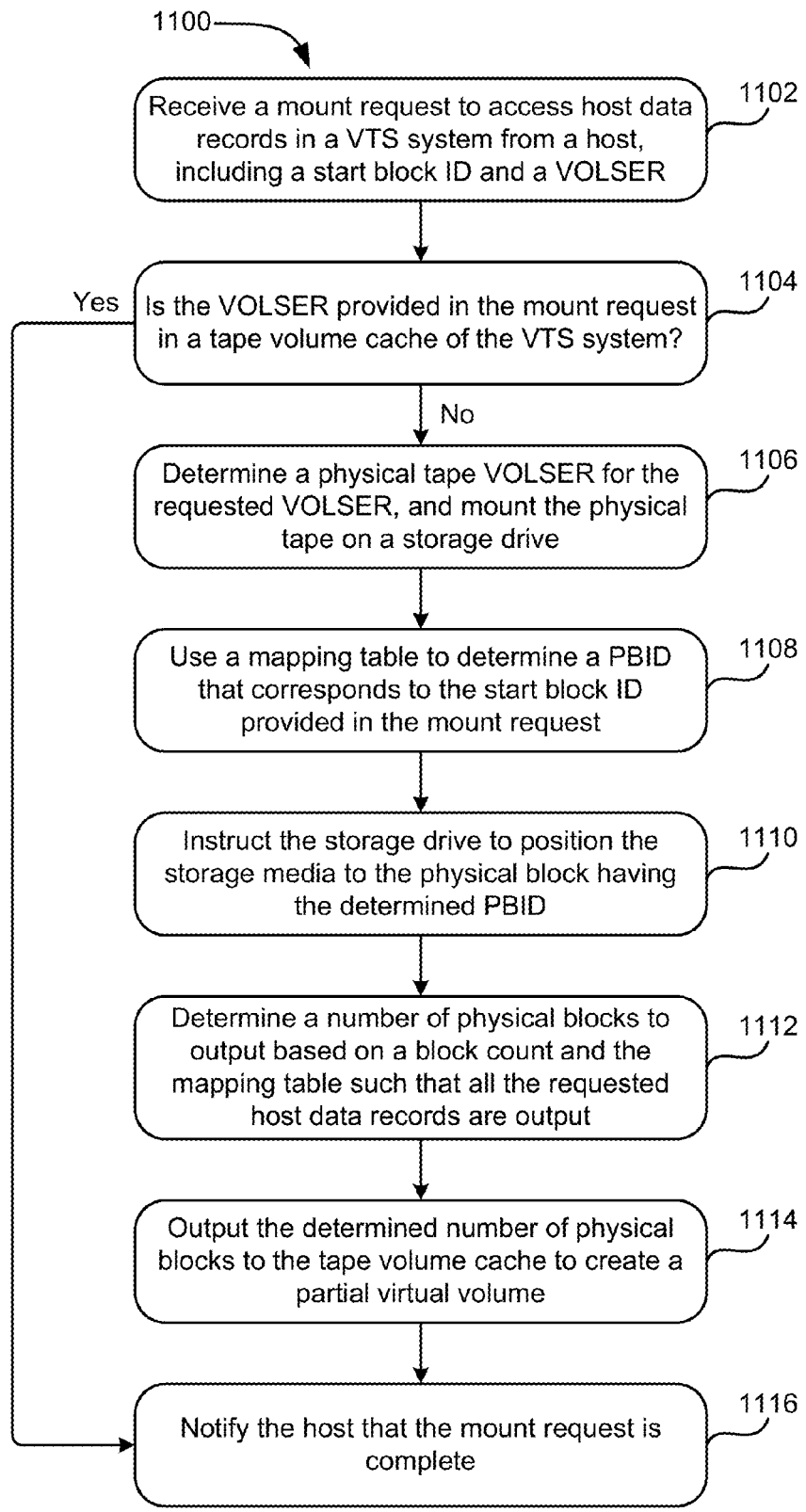
FIG. 11 is a flow diagram of a method, according to one embodiment.

Now referring to FIGS. 8 and 11, FIG. 11 shows a method 1100 for accessing data stored in a virtual tape storage (VTS) system is shown according to one embodiment. The method 1100 may be carried out in any desired environment, including those described herein, and may include embodiments and/or approaches described herein. Also, the method 1100 may include more operations than those described below, as would be known to one of skill in the art.

In operation 1102, a mount request is received to access host data records in a virtual tape storage (VTS) system. In one approach, the host mount request 400 may include information about the start block ID 430 of the first host data record 220 and the number of host data records to access.

In operation 1104, the VTS system determines if the requested VOLSER in the mount request resides in the tape volume cache 50 using the VOLSER database table 68, in one approach. If it does, the process continues to operation 1116, if not, it proceeds to operation 1106.

In operation 1106, the physical tape VOLSER 530 for the requested VOLSER is determined and is mounted on a storage drive 70. In other embodiments, other sequential storage media and/or drives may be used, such as tape drives and tape media, optical drives and optical media, etc.

In operation 1108, the start block ID 430 corresponding to the beginning of the requested host data records along with information in the mapping table 600 is used to determine the physical block ID (PBID) to position the tape media such that the beginning of the requested host data records can be read. In one approach, the start block ID 430 may be provided to the VTS system via the mount request. In other embodiments, the mount request may include some information that may be used by the VTS system to determine the start block ID 430 and/or the PBID.

In operation 1110, the storage drive 70 is instructed to position the storage media 80 to the physical block having the PBID determined in operation 1108. In some embodiments, the physical block may comprise 256 KB of data. In alternative approaches, the physical block may comprise 64, 128, 512, 1024 KB of data, etc.

In operation 1112, a block count 440 and the mapping table 600 are used to determine a number of physical blocks to read/output to ensure that all of the requested host data records 220 are output to the tape volume cache 50. In other embodiments, the mount request may include some information that may be used by the VTS system to determine the number of requested host data records 220 to read/output.

In operation 1114, the physical blocks, beginning with the one the storage drive 70 was positioned to and continuing for the number needed to read all the requested host data records 220 into the tape volume cache 50, are read. In some embodiments, the data mover 40 copies the data from the storage drive 70 reading the storage media 80 to the tape volume cache 50 where a host application can access it. In other embodiments, any other method may be used as would be known to one of skill in the art, such as transferring the data included in the physical block to a host system, printing the data included in the physical block, allowing a host system to access the logical volume, etc. In some approaches, this may be referred to as partial volume recall, since the entire volume is not output, such as to a tape volume cache (which may be comprised of random access storage).

In operation 1116, the host that made the mount request is notified that the request is complete.

Figure 12:
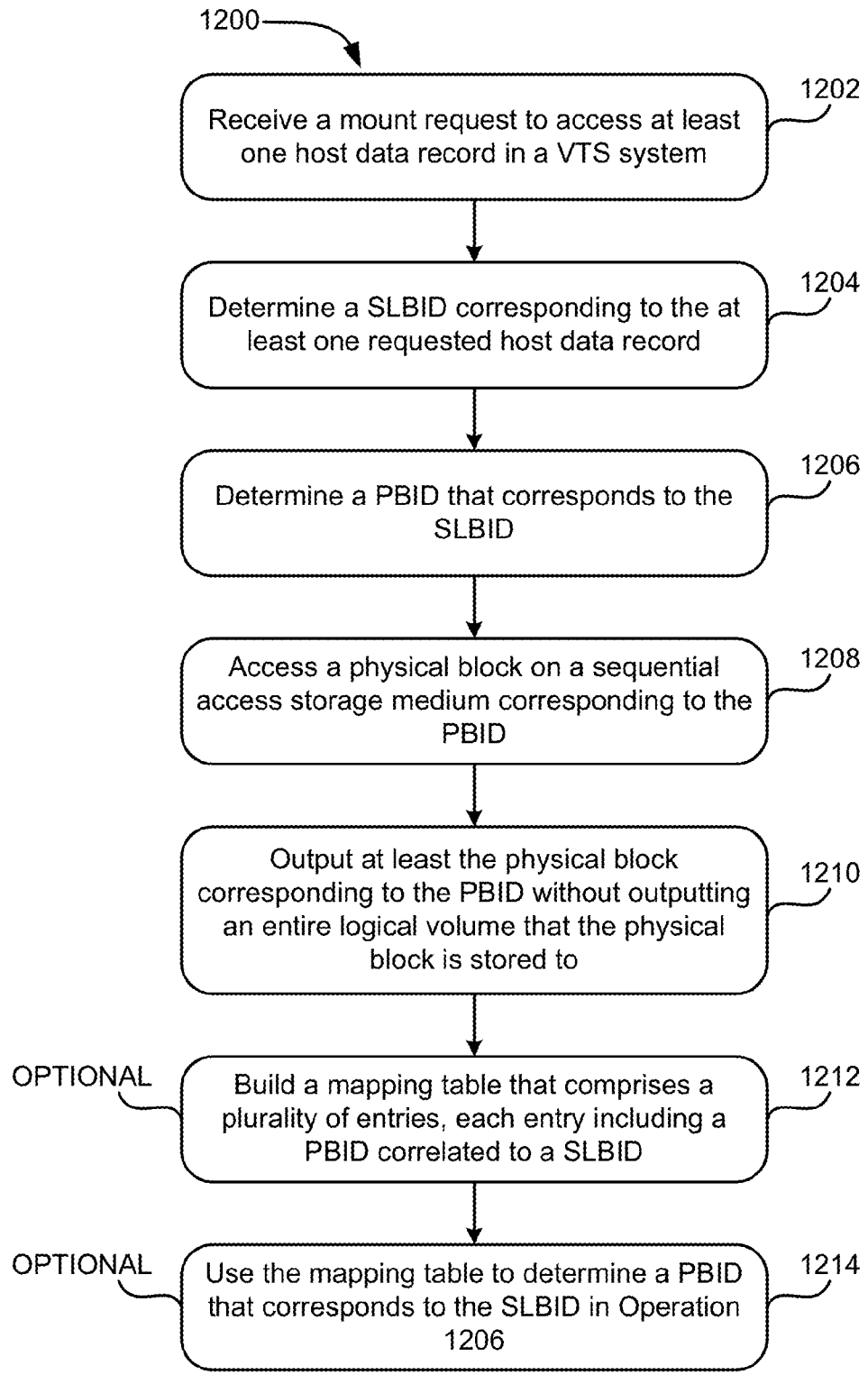
FIG. 12 is a flow diagram of a method, according to one embodiment.

Now referring to FIG. 12, a method 1200 for accessing host data records stored in a virtual tape storage (VTS) system is shown according to one embodiment. The method 1200 may be carried out in any desired environment, including those described herein, and may include embodiments and/or approaches described herein. Also, the method 1200 may include more operations than those described below, as would be known to one of skill in the art.

In operation 1202, a mount request is received to access at least one host data record in a VTS system. In one approach, the mount request may include information that directs the VTS system to the physical block having a determined PBID, such as a SLBID.

In operation 1204, a SLBID corresponding to the at least one requested host data record is determined. In one approach, the SLBID may be provided to the VTS system via the mount request. In other embodiments, the mount request may include some information that may be used by the VTS system to determine the SLBID or PBID of the at least one host data record.

In operation 1206, a PBID that corresponds to the SLBID is determined. In some embodiments, a physical block which corresponds to the PBID may comprise 256 KB of data. In alternative approaches, the physical block may comprise 64, 128, 512, 1024 KB of data, etc.

In operation 1208, a physical block on a sequential access storage medium corresponding to the PBID is accessed. In one embodiment, the sequential access storage medium may comprise a magnetic tape medium.

In operation 1210, at least the physical block corresponding to the PBID is output without outputting an entire logical volume that the physical block is stored to. Any output method may be used as would be known to one of skill in the art, such as transferring the data included in the physical block to a host system, printing the data included in the physical block, allowing a host system to access a virtual volume comprising the data in the physical block, etc. In some approaches, this may be referred to as partial volume recall, since the entire logical volume is not output, such as to a tape volume cache (which may be comprised of random access storage).

In optional operation 1212, a mapping table is built that comprises a plurality of entries. Each entry includes a PBID correlated to a SLBID stored to the VTS system. In some approaches, the mapping table may comprise an entry for every Nth SLBID stored to the VTS system, where N may be any suitable number, such as 1, 10, 20, 50, 100, 1000, etc.

In optional operation 1214, the mapping table is used to determine a PBID that corresponds to the SLBID. This may be accomplished by looking up the SLBID, and then cross referencing this SLBID to locate a PBID which would include the host data record having the SLBID. Of course, techniques described herein may be used to ensure that information is accessed far enough before the host data record having the SLBID such that no information is missed, and the sequential access storage, such as magnetic tape, does not incur back-hitching.

According to another embodiment, a VTS system comprises random access storage (such as hard disk, optical disk, etc.), sequential access storage (such as magnetic tape, etc.), support for at least one virtual volume, a storage manager having logic for determining a PBID that corresponds to a SLBID, and logic for copying a portion of a logical volume from the sequential access storage to the random access storage without copying the entire logical volume.

In one embodiment, a storage capacity of the sequential access storage may be at least 5 times greater than a storage capacity of the random access storage. In other embodiments, it may be at least 2 times greater, 10 times greater, 15 times greater, 50 times greater, 1000 times greater, etc.

In more approaches, the VTS system may include logic for compressing host data records prior to storing the host data records to the at least one virtual volume. Further, the VTS system may provide a host system with access to host data records stored to the at least one virtual volume via copying a portion of the logical volume to the random access storage which may be accessed by the host system.

In more approaches, the host system may provide the VTS system with information that directs the VTS system to the portion of the logical volume to copy. In another further embodiment, the information that directs the VTS system to the portion of the logical volume to copy may include a SLBID. In these systems, the VTS system may determine a PBID of a physical block stored to the sequential access storage that corresponds to the SLBID.

In another embodiment, the VTS system may further include logic for building a mapping table for the at least one virtual volume. The mapping table may comprise a plurality of entries, and each entry may include a SLBID that corresponds to a PBID of a physical block stored to the sequential access storage. In one approach, the mapping table may comprise an entry for every Nth data block stored to the sequential access storage, wherein N may be any suitable number, such as 1, 10, 20, 50, 100, 1000, etc.

In a preferred embodiment, the VTS system may employ a hierarchical storage system. Additionally, the random access storage may comprise magnetic disk media and the sequential access storage may comprise magnetic tape media.

According to another embodiment, a computer program product includes a computer readable storage medium having computer readable program code embodied therewith. The computer readable program code comprises computer readable program code configured to send a mount request to access at least one host data record in a VTS system, the mount request including a SLBID of a first host data record, and computer readable program code configured to access a tape volume cache of the VTS system once the at least one requested host data record is available.

According to another embodiment, a computer program product includes a computer readable storage medium having computer readable program code embodied therewith. The computer readable program code comprises computer readable program code configured to receive a mount request to access at least one host data record in a VTS system, computer readable program code configured to determine a SLBID corresponding to the at least one requested host data record, computer readable program code configured to determine a PBID that corresponds to the SLBID, computer readable program code configured to access a physical block on a magnetic tape medium corresponding to the PBID, and computer readable program code configured to output at least the physical block without outputting an entire logical volume that the physical block is stored to.

In some embodiments, the computer program product may further comprise computer readable program code configured to build a mapping table that comprises a plurality of entries, wherein each entry includes a PBID correlated to a SLBID stored to the VTS system. Additionally, computer readable program code configured to use the mapping table to determine a PBID that corresponds to the SLBID may be included. In another approach, the mapping table may comprise an entry for every Nth starting logical block ID stored to the VTS system.

In another embodiment, the computer readable program code configured to output at least the physical block may comprise computer readable program code configured to allow an application access to the physical block. In some approaches, the application may also provide the SLBID.

According to another embodiment, a VTS system includes at least two levels of hierarchical storage, comprising: a first level being random access storage comprising at least one hard disk media, and a second level being sequential access storage comprising at least one magnetic tape media, logic for constructing a mapping table that relates SLBIDs of host data records to PBIDs of physical blocks stored to the magnetic tape media, logic for receiving a mount request to access at least one host data record, logic for determining a SLBID corresponding to the at least one requested host data record, wherein the SLBID is determined from information provided in the mount request, logic for determining a PBID that corresponds to the SLBID using the mapping table, and logic for copying at least the physical block corresponding to the PBID from the magnetic tape media to the hard disk media without copying an entire logical volume that the physical block is stored to.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for accessing host data records stored in a virtual tape storage (VTS) system, the computer program product comprising:
    a non-transitory computer readable storage medium having computer readable program code embodied therewith, the computer readable program code comprising:
        computer readable program code configured to receive a mount request to access at least one host data record in a VTS system, the mount request including at least:
            a block count field indicating a number of physical blocks to return; and
            a block size field indicating a size of each physical block to return;
        computer readable program code configured to determine a starting logical block ID (SLBID) corresponding to the at least one host data record;
        computer readable program code configured to determine a physical block ID (PBID) that corresponds to the SLBID;
        computer readable program code configured to access a physical block on a magnetic tape medium corresponding to the PBID based on a value in the block size field; and
        computer readable program code configured to output a number of physical blocks sufficient to encompass the at least one host data record without outputting an entire logical volume that the physical block is stored to based on the block count field.

2. The computer program product as recited in claim 1, further comprising computer readable program code configured to build a mapping table that comprises a plurality of entries, wherein each entry includes a PBID correlated to a SLBID stored to the VTS system.

3. The computer program product as recited in claim 2, further comprising computer readable program code configured to use the mapping table to determine a PBID that corresponds to the SLBID.

4. The computer program product as recited in claim 2, wherein the mapping table comprises an entry for every Nth SLBID stored to the VTS system, and wherein N is an integer equal to 2 or greater.

5. The computer program product as recited in claim 1, wherein the computer readable program code configured to output at least the physical block comprises computer readable program code configured to allow an application access to the physical block.

6. The computer program product as recited in claim 1, wherein the SLBID is provided in the mount request.

7. The computer program product as recited in claim 6, wherein only a number of physical blocks corresponding to a value in the block field are copied to a random access storage media of the VTS system.

8. The computer program product as recited in claim 4, wherein N is an integer equal to 25 or greater.

9. The computer program product as recited in claim 6, wherein the SLBID is provided by an application sending the mount request.

10. The computer program product as recited in claim 1, wherein the at least one host data record is output without knowing a compressibility of the at least one host data record.

11. A virtual tape storage (VTS) system, comprising:
    at least two levels of hierarchical storage, comprising:
        a first level being random access storage comprising at least one hard disk media; and
        a second level being sequential access storage comprising at least one magnetic tape media;
    logic configured to construct a mapping table that relates starting logical block IDs (SLBIDs) of host data records to physical block IDs (PBIDs) of physical blocks stored to the magnetic tape media;
    logic configured to receive a mount request to access at least one host data record;
    logic configured to determine a SLBID corresponding to the at least one host data record, wherein the SLBID is determined from information provided in the mount request;
    logic configured to determine a PBID that corresponds to the SLBID using the mapping table; and
    logic configured to copy at least the physical block corresponding to the PBID from the magnetic tape media to the hard disk media without copying an entire logical volume that the physical block is stored to and without knowing a compressibility of the at least one host data record,
    wherein the SLBID is provided in the mount request,
    wherein the mount request further includes a block count value, and
    wherein only a number of physical blocks corresponding to the block count are copied to the random access storage.

12. The system as recited in claim 11, further comprising logic configured to receive a mount request to access at least one host data record stored to the sequential access storage.

13. The system as recited in claim 11, wherein the mount request further includes a block size field.

14. The system as recited in claim 12, wherein the SLBID is provided by an application sending the mount request.

15. The system as recited in claim 14, further comprising receiving a block count value from the application, wherein only a number of physical blocks corresponding to the block count are copied to the random access storage.

16. A virtual tape storage (VTS) system, comprising:
    at least two levels of hierarchical storage, comprising:
        a first level being random access storage comprising at least one hard disk media; and
        a second level being sequential access storage comprising at least one magnetic tape media;
    logic configured to construct a mapping table that relates starting logical block IDs (SLBIDs) of host data records to physical block IDs (PBIDs) of physical blocks stored to the magnetic tape media;

logic configured to receive a mount request to access at least one host data record;

logic configured to determine a SLBID corresponding to the at least one host data record, wherein the SLBID is determined from information provided in the mount request, and wherein the SLBID is provided by an application sending the mount request;

logic configured to receive a block count value from the application;

logic configured to determine a PBID that corresponds to the SLBID using the mapping table; and logic configured to copy at least the physical block corresponding to the PBID from the magnetic tape media to the hard disk media without copying an entire logical volume that the physical block is stored to and without knowing a compressibility of the at least one host data record, wherein only a number of physical blocks corresponding to the block count are copied to the random access storage.

\* \* \* \* \*